(12) United States Patent
Divine et al.

(10) Patent No.: US 7,147,156 B2
(45) Date of Patent: Dec. 12, 2006

(54) APPARATUS AND METHOD FOR SOUND-ENABLING REGULAR PLASTIC

(75) Inventors: Cedric Divine, Memphis, TN (US); Ben Ayed, Medford, MA (US)

(73) Assignee: Cedric Eugene Divine, Memphis, TN (US)

( * ) Notice: Subject to any disclaimer, the term of this patent is extended or adjusted under 35 U.S.C. 154(b) by 130 days.

(21) Appl. No.: 10/910,540

(22) Filed: Aug. 4, 2004

(65) Prior Publication Data

US 2006/0027665 A1 Feb. 9, 2006

(51) Int. Cl.
*G06K 19/06* (2006.01)
*G06K 7/08* (2006.01)

(52) U.S. Cl. ........................ 235/449; 235/492
(58) Field of Classification Search ................ 235/441, 235/486, 487, 380, 492, 493; 361/633, 752, 361/362
See application file for complete search history.

(56) References Cited

U.S. PATENT DOCUMENTS

| | | | | |
|---|---|---|---|---|
| 5,717,574 | A | * | 2/1998 | Gustafson .................... 361/752 |
| 5,841,119 | A | * | 11/1998 | Rouyrre et al. ............. 235/380 |
| 6,874,683 | B1 | * | 4/2005 | Keronen et al. ............ 235/380 |
| 2004/0050933 | A1 | * | 3/2004 | Keronen et al. ............ 235/380 |
| 2005/0023338 | A1 | * | 2/2005 | Goldenberg et al. ........ 235/375 |
| 2005/0263596 | A1 | * | 12/2005 | Nelson et al. .............. 235/441 |

\* cited by examiner

*Primary Examiner*—Thien M. Le

(57) ABSTRACT

A method for sound-enabling a plastic card without interfering with the operation of the card consists of drilling small holes in the card in the area that does not have a magnetic strip or embossed characters, and inserting thin integrated circuits containing a touch sensor, a speaker, a rechargeable capacitor and a controller. A thin sticky film is used to hold the system together. Electrical connectors on the surface of the card are used to recharge the battery and to change the recording. The user of the plastic card can activate the sound recording by pushing a touch sensor.

14 Claims, 4 Drawing Sheets

APPARATUS AND METHOD FOR SOUND-ENABLING REGULAR PLASTIC

FIELD OF THE INVENTION

This invention relates to a device for implanting circuitry into regular plastic cards and thus rendering them capable of producing audio signals. More specifically, this device:
- Embeds a sound production system into regular plastic cards
- Recharges the internal power supply, and
- Changes/alters the recorded audio information.

BACKGROUND OF THE INVENTION

A widely used, highly popular method of conducting monetary transactions involves use of automatic teller machines, commonly referred to as ATMs. Credit card processing machines, which permit monetary transactions to occur through the use of small cards which carry information about the person to whom the card is issued on a magnetic strip, also remain widely used, as do conventional vending machines, public telephones and the like which accept hard currency. In addition, cards which hold a wide variety of information and which may be credited or debited at a given transaction site, the so-called integrated circuit or "smart" cards, are expected to become widely used in conjunction with card-receiving integrated circuit card readers and located in variety of settings, including, for example, vending machines, checkout counters, copy centers, gasoline station pumps, and just about every other place in which money may be exchanged.

As the number of cards increases, it becomes more difficult for sight-impaired persons and people with low-vision to distinguish between them. The current way to address this problem is to provide tactile displays, such as instructions in Braille, however, most people with low vision or that are print-disabled are not familiar with Braille.

A recent study (Chiang, et. al, Milbank Quarterly, 1992) estimates 1.1 million people are legally blind under the definition of tested acuity (<20/200). Many other disabilities prevent persons from reading print. In addition to people who are blind or have low vision and may not be able to see the print, there are many stroke, head-injured, autistic and dyslexic (or even just educationally impaired) persons who may not be able to assimilate printed language even though they can see the page. Many people can accept this information through speech.

Electronic message emitting devices and the like having various designs, structures, configurations and materials of construction have been disclosed in the prior art. For example, U.S. Pat. No. 4,219,800 to Leavens discloses an electronic device having a power source, a sign with a message, and an audible reminder signal.

U.S. Pat. No. 5,359,374 to Schwartz discloses a talking picture frame having a still video image placed within a frame or plaque and also having an associated audio message stored on a recording and playback unit. The recording and playback unit is self-contained and affixed to the frame to allow for instant and repeated playback of the audio message when desired. Both the video image and the recorded message can be varied and changed according to the user's desire.

U.S. Pat. No. 5,463,369 to Lamping discloses an electronic device having a power source, a sound chip having a message, and a picture mounted on the front of the device.

U.S. Pat. No. 5,480,156 to Doederlein et al discloses a squeezable talking trading card capable of generating an audio message including a thin housing having front and back surfaces, flexible sheets having indicia affixed to the front and back surfaces of the housing, a sound chip located in the housing for generating a given message, a battery for supplying electrical power to the sound chip, and a switch located in the housing for activating a sound chip.

U.S. Pat. No. 5,588,678 to Young discloses a talking trading card having two printed trading cards attached to the top and bottom sides of a substrate in which is housed the mechanism for powering, storing, activating and emitting a recorded sound and/or message. The audio message may be pre-recorded in a sound chip or may be programmed into the sound chip after the manufacture of the talking card through a receptacle placed on the side of the talking card.

Techniques for incorporating sound messages into greeting cards are known in the prior art. An example of such a device is disclosed in U.S. Pat. No. 5,063,698. Here, the user records a message into a telephone answering machine, which the vendor of the card then encodes into a small, battery operated playback device installed in the card. When the card is opened, a switch may be depressed to activate playback of the sound message. A similar recording and playback device for use in a postcard is disclosed in U.S. Pat. No. 4,791,741.

A need is emerging by which a visually impaired person distinguish between different plastic cards. Any device fulfilling this need must not interfere with any encoded information, e.g. a magnetic strip card or the card reader machine. Furthermore, this device must quickly, reliably and conveniently convert regular plastic cards into auditory (sound enabled) plastic cards. This invention will fulfill this need and satisfy these two requirements.

Thus, there is a need for a convenient and reliable method and apparatus for sound-enabling regular plastic cards.

SUMMARY OF INVENTION

An apparatus for implanting circuitry into a regular plastic card and rendering it capable of producing audio signals comprising:
  a card holder,
  a drilling device for drilling holes in the plastic card,
  a chip fitting mechanism for embedding silicon chips in the plastic card,
  connectors for connecting to the plastic card and recharging the power supply onboard said plastic card;
  connectors for connecting to the plastic card and loading digital sound files to memory onboard said plastic card.

A method for implanting circuitry into a regular plastic card and rendering it capable of producing audio signals comprising:
  drilling holes in the plastic card in the area that does not have a magnetic strip or embossed characters,
  embedding a sound production system into said plastic card,
  recharging the internal power supply of said plastic card, and,
  changing and altering the recorded information.

A plastic card comprising:
  a magnetic strip,
  embossed characters,
  electronic chips located in the area that does not have a magnetic strip or embossed characters,
  capacitors for storing power,
  memory for storing sound recordings, a speaker,
connectors,
a switch for playing said sound recording.

BRIEF DESCRIPTION OF THE DRAWINGS

The present invention will be more clearly understood after reference to the following detailed specifications read in conjunction with the drawings wherein.

Similar reference numerals are used in different figures to denote similar components.

DETAILED DESCRIPTION OF THE PREFERRED EMBODIMENTS

Figure 1:
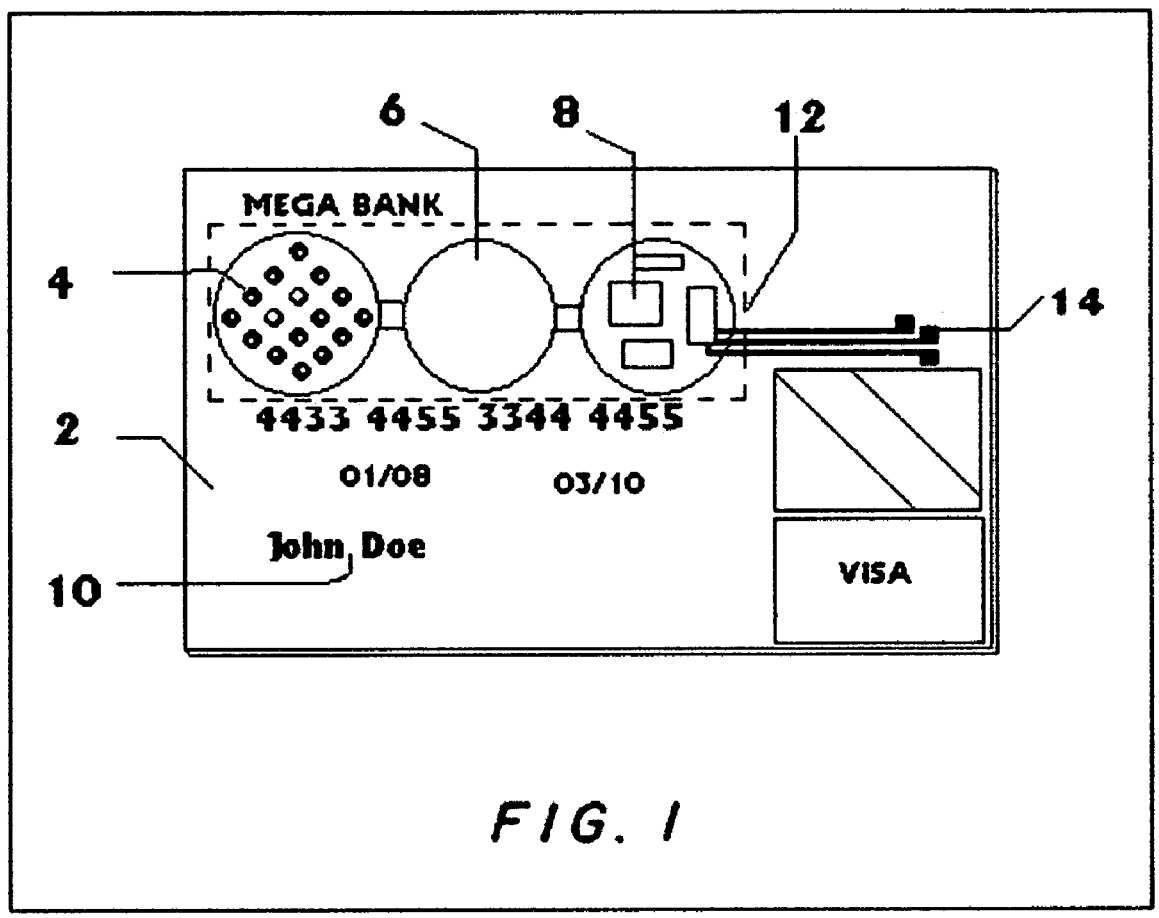
FIG. 1 is a top perspective view of the front of a plastic card.

Referring to FIG. 1, a plan view of the top of the novel card 2 is shown and having an area on which symbols are printed representing a bank, a credit card company, a medical insurance company or any other company. The card contains embossed letters and numbers representing card information and customer name information 10. Electronic module 12 is embedded within the card and provides audio message playback functionality. Orifices 4 are formed in the upper card 2 to emit audible messages from a speaker located within the card. An activation sensor 6, which may be any well-known type of switch such as a touch sensor or a pressure-sensitive switch, is located within the card and can be used to activate the circuitry. A circuit 8, which may be any type of electronic circuit or printed circuit, is located within the card and is used to control and support the message playback functionality. Also, connectors 14 are used to recharge power and update the audio message recordings.

Figure 2:
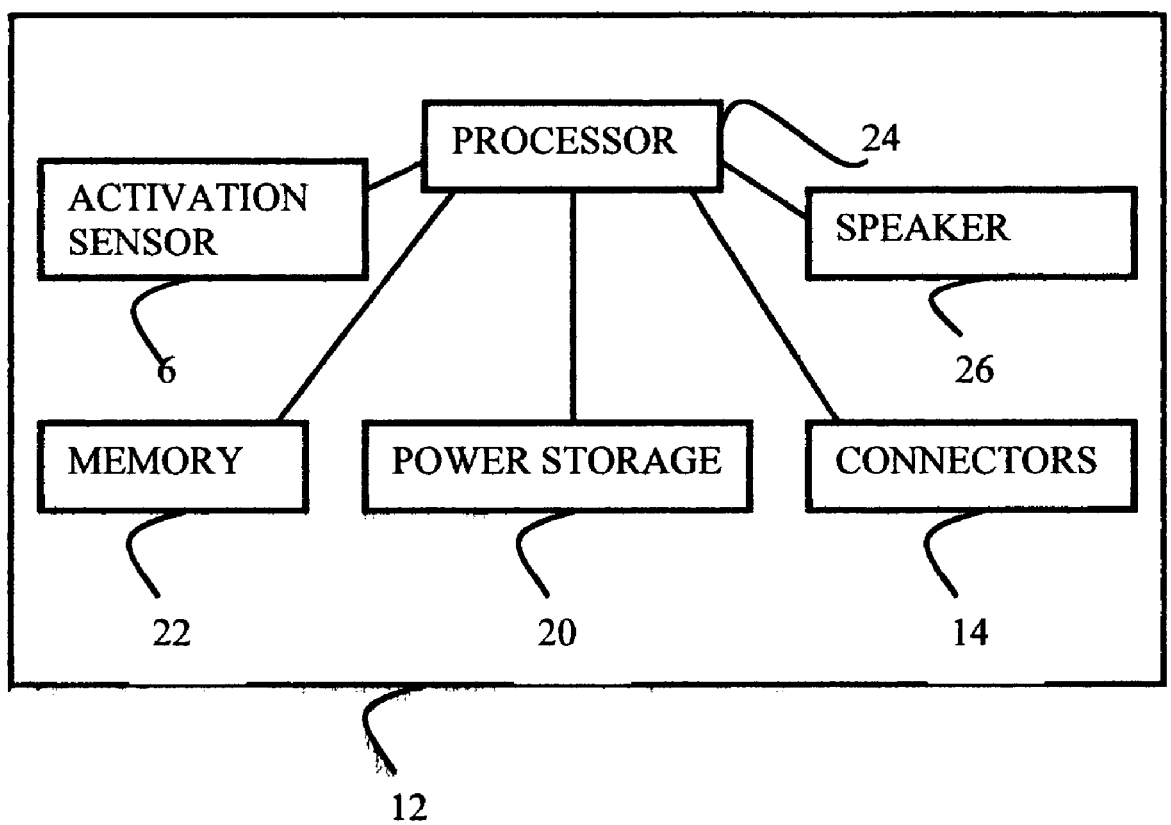
FIG. 2 is a block diagram of an electronic module.

Referring now to FIG. 2, electronic module 12 is comprised of power storage device 20, activation sensor 6, speaker 26, memory storage device 22, and processor 24 connected to connectors 14. Power storage device 20 can be any type of power storage system such as a rechargeable battery or a capacitor. Memory storage device 22 can be any type of digital storage device such as RAM, EPROM, or other devices. Processor 24 can be any type of controller or microprocessor. Connectors 14 can be any kind of connectors such as surface connectors. Also, speaker 26 can be any type of speaker.

Processor 24 collaborates with activation sensor 6 to detect user events indicating a request to play a message. Processor 24 activates speaker 26 and transmits the digital sound message contained in memory 22. Processor 24 detects a recharging event when connectors 14 are connected to an electronic circuit. Processor 24 manages the recharging of power storage device 20 and the updating of the digital sound message in memory device 22.

Figure 3:
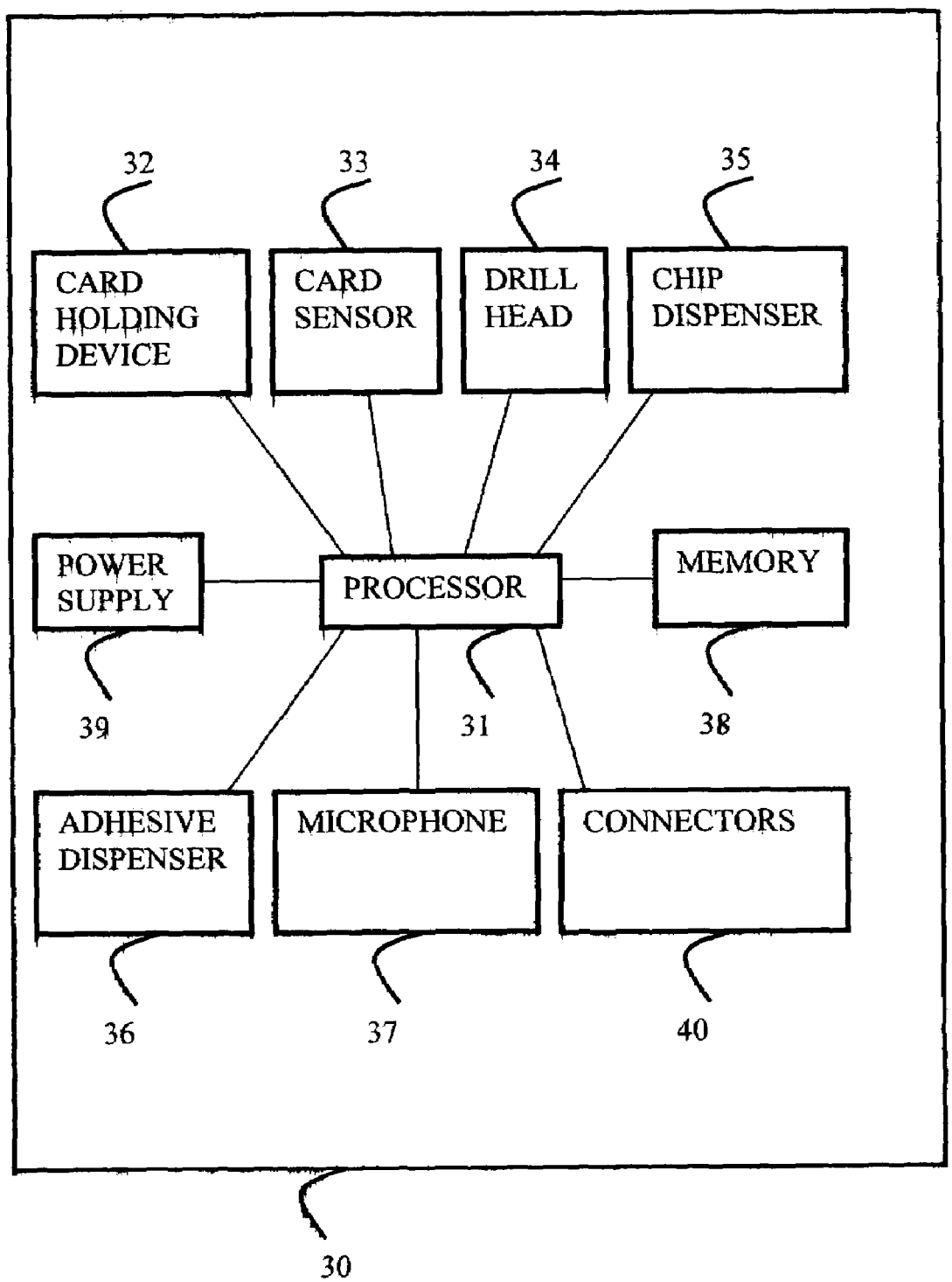
FIG. 3 is a block diagram of an apparatus for sound enabling plastic cards.

Referring now to FIG. 3, a plastic card sound enabling apparatus 30 is comprised of a processor 31, a card holding device 32, a card sensor 33, a drill head 34, a chip dispenser 35, an adhesive dispenser 36, a microphone 37, memory 38, power supply 39 and connectors 40.

The user places a plastic card in the plastic card sound enabling apparatus 30 and attaches it using a card holding device 32. Processor 31 controls a variety of card sensors 33 to detect the card orientation, the location of the magnetic strip and the embossed symbols on the card. Processor 31 calculates the available area on the plastic card exclusive of the magnetic strip and of the embossed characters and determines the location and the size of the drill holes in a way that does not interfere with the operation of the card. Processor 31 controls drill head 34 to drill required holes. It controls chip dispenser 35 to lay required chips in those holes and controls adhesive dispenser to lay adhesive and adhesive film on the card surface. In a preferred embodiment, adhesive film pieces are placed in locations on the front and back of the plastic card. Also, the thickness of the plastic is limited to the thickness accepted by most banking machines. Processor 31 can then trigger a transfer of power and a transfer of digital sound message to the plastic card through connectors 40.

Figure 4:
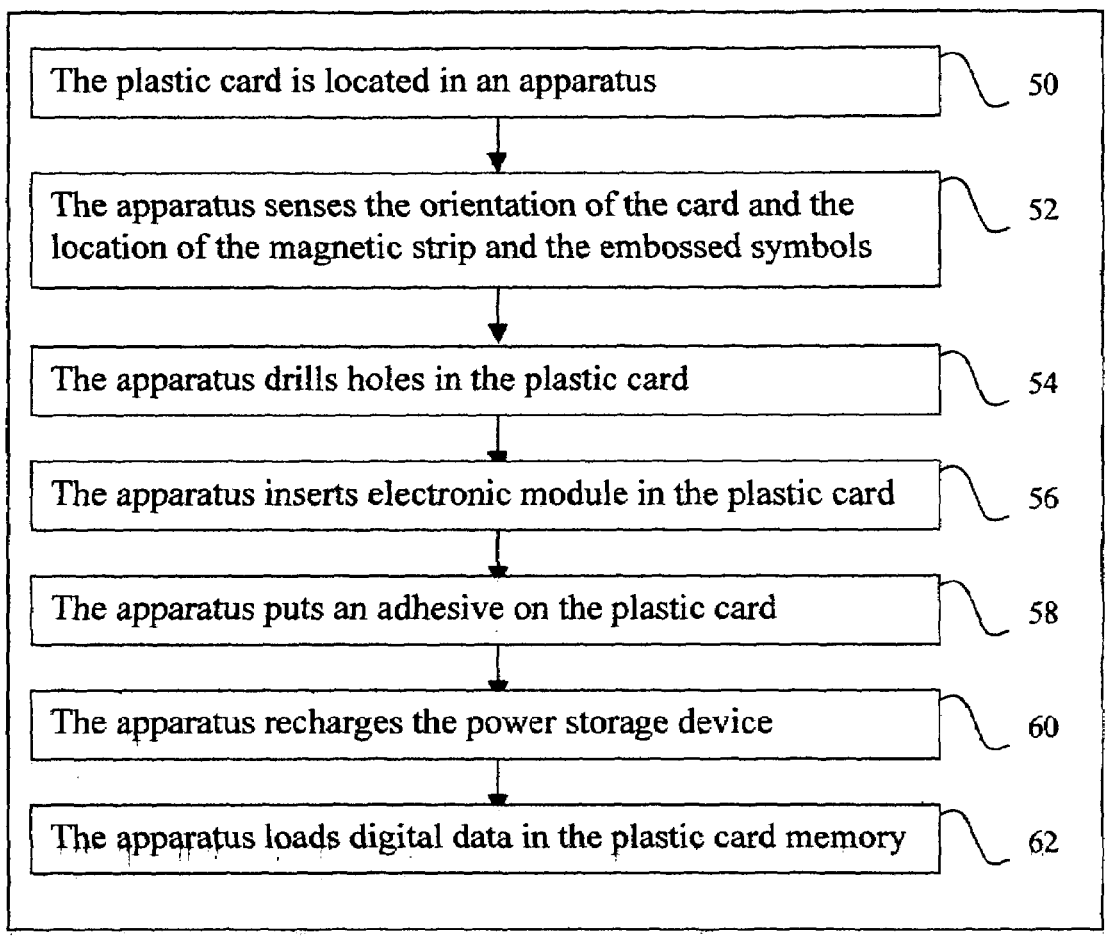
FIG. 4 is a flowchart illustrating the operation of the plastic card sound enabling apparatus.

Referring now to FIG. 4, the flowchart illustrates the operation of the plastic card sound enabling apparatus. In step 50, the user places a plastic card in the plastic card sound apparatus. In step 52, a sensor detects if the card is positioned correctly, and senses the location of the magnetic strip and of the embossed characters and letters on the card. A processor calculates the available area on the plastic card exclusive of the magnetic strip and of the embossed characters and determines the location and the size of the drill holes in a way that does not interfere with the operation of the card. In step 54, the apparatus drills holes in the plastic card and in step 56, inserts an electronic module 12 in the plastic card. The apparatus puts an adhesive on card 2 in step 58. The apparatus may ensure that the card thickness is within acceptable range. It recharges the power storage device 20 in step 60 and loads digital sound data in memory 22 in step 62.

Numerous other modifications, variations, and adaptations may be made to the particular embodiment of the invention described above without departing from the scope of the invention, which is defined in the claims.

What is claimed is:

1. An apparatus for implanting circuitry into a regular plastic card and rendering it capable of producing audio signals comprising: a card holder, a drilling device for drilling holes in the plastic card, a chip fitting mechanism for embedding silicon chips in the plastic card, connectors for connecting to the plastic card and recharging the power supply onboard said plastic card, connectors for connecting to the plastic card and loading digital sound files to memory onboard said plastic card.

2. The apparatus of claim 1 comprising: a sensor for detecting the area of the plastic card exclusive of the magnetic strip and of the embossed characters, a processor to determine the location and the size of holes to contain electronic chips.

3. The apparatus of claim 1 whereby said plastic card is a magnetic strip card.

4. The apparatus of claim 1 whereby said apparatus comprises a microphone for recording a digital sound message to be loaded on said chip onboard said plastic card.

5. The apparatus of claim 1 whereby said apparatus comprises a mechanism for laying adhesive on said plastic card.

6. The apparatus of claim 1 whereby said apparatus detects the location of embossed letters on said plastic card.

7. The apparatus of claim 1 whereby said chip comprises a touch sensor for activating said recording.

8. A method for implanting circuitry into a regular plastic card and rendering it capable of producing audio signals comprising: drilling holes in the plastic card in the area that does not have a magnetic strip or embossed characters, embedding a sound production system into said plastic card, recharging the internal power supply of said plastic card, and, loading information onto said card.

9. The method of claim 8 comprising: scanning the plastic card and determining areas that do not have a magnetic strip or embossed characters, determining the location and the size of holes to contain electronic chips.

10. The method of claim 8 comprising recording a sound message.

11. The method of claim 8 comprising laying adhesive on said plastic card.

12. The method of claim 8 comprising checking that the plastic card thickness is within a specific range.

13. A plastic card having a thickness corresponding to that accepted by banking machines whereby electronics elements are surface mounted to a plastic card comprising A magnetic strip, Embossed characters, Electronic chips located in the area that does not have a magnetic strip or embossed characters, Capacitors for storing power, Memory for storing sound recordings, A speaker for playing a recording, Connectors on the surface of the card for recharging power, Connectors on the surface of the card for loading sound files.

14. The apparatus of claim 13 whereby said switch is a touch sensor.

* * * * *